US012698975B2

(12) United States Patent
Yumita

(10) Patent No.: US 12,698,975 B2
(45) Date of Patent: Aug. 4, 2026

(54) INFORMATION PROCESSING DEVICE AND OPERATION SYSTEM

(71) Applicant: TOYOTA JIDOSHA KABUSHIKI KAISHA, Toyota (JP)

(72) Inventor: Osamu Yumita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/776,473

(22) Filed: Jul. 18, 2024

(65) Prior Publication Data

US 2025/0116524 A1     Apr. 10, 2025

(30) Foreign Application Priority Data

Oct. 10, 2023     (JP) ................................. 2023-175324

(51) Int. Cl.
*G01C 21/34* (2006.01)
*G06Q 10/0633* (2023.01)
*G06Q 50/40* (2024.01)

(52) U.S. Cl.
CPC ..... *G01C 21/3469* (2013.01); *G06Q 10/0633* (2013.01); *G06Q 50/40* (2024.01)

(58) Field of Classification Search
None
See application file for complete search history.

(56) References Cited

U.S. PATENT DOCUMENTS

2011/0246252 A1     10/2011   Uesugi
2017/0308849 A1*    10/2017   Roush ............... G06Q 10/0836

2023/0168092 A1*    6/2023   Roherty ............. G01C 21/3685
701/465
2023/0229979 A1*    7/2023   Kogo ....................... B60L 58/12
705/5
2024/0361137 A1*    10/2024   Aviv ....................... B60L 58/12
2025/0069177 A1     2/2025   Oi et al.

FOREIGN PATENT DOCUMENTS

DE       102019005062 A1 *   1/2021   ........... G06Q 10/063
JP       2004-131270 A        4/2004
JP       2011-253257 A       12/2011
WO       2023/127099 A1       7/2023

OTHER PUBLICATIONS

Machine translation of Wagner et al. (DE-102019005062-A1 (Year: 2021).*

* cited by examiner

*Primary Examiner* — Navid Z. Mehdizadeh
*Assistant Examiner* — Sarah A. Mueller
(74) *Attorney, Agent, or Firm* — SoraIP, Inc.

(57)     ABSTRACT

The information processing device performs searching for a route including a plurality of target points and a target charging location, and generating an operation plan such that electrified vehicle is operated according to the route in each of a first operation period set prior to the prohibited time period and a second operation period set after the prohibited time period. Electrified vehicle operation is prohibited during the prohibited time period. The information processing device sets, for the operation plan, a charging period in which electrified vehicle is charged at the target charging location such that a starting time of the charging period is earlier than a prohibited time period and an ending time of the charging period is later than a prohibited time period or a prohibited time period.

6 Claims, 6 Drawing Sheets

FIG. 2

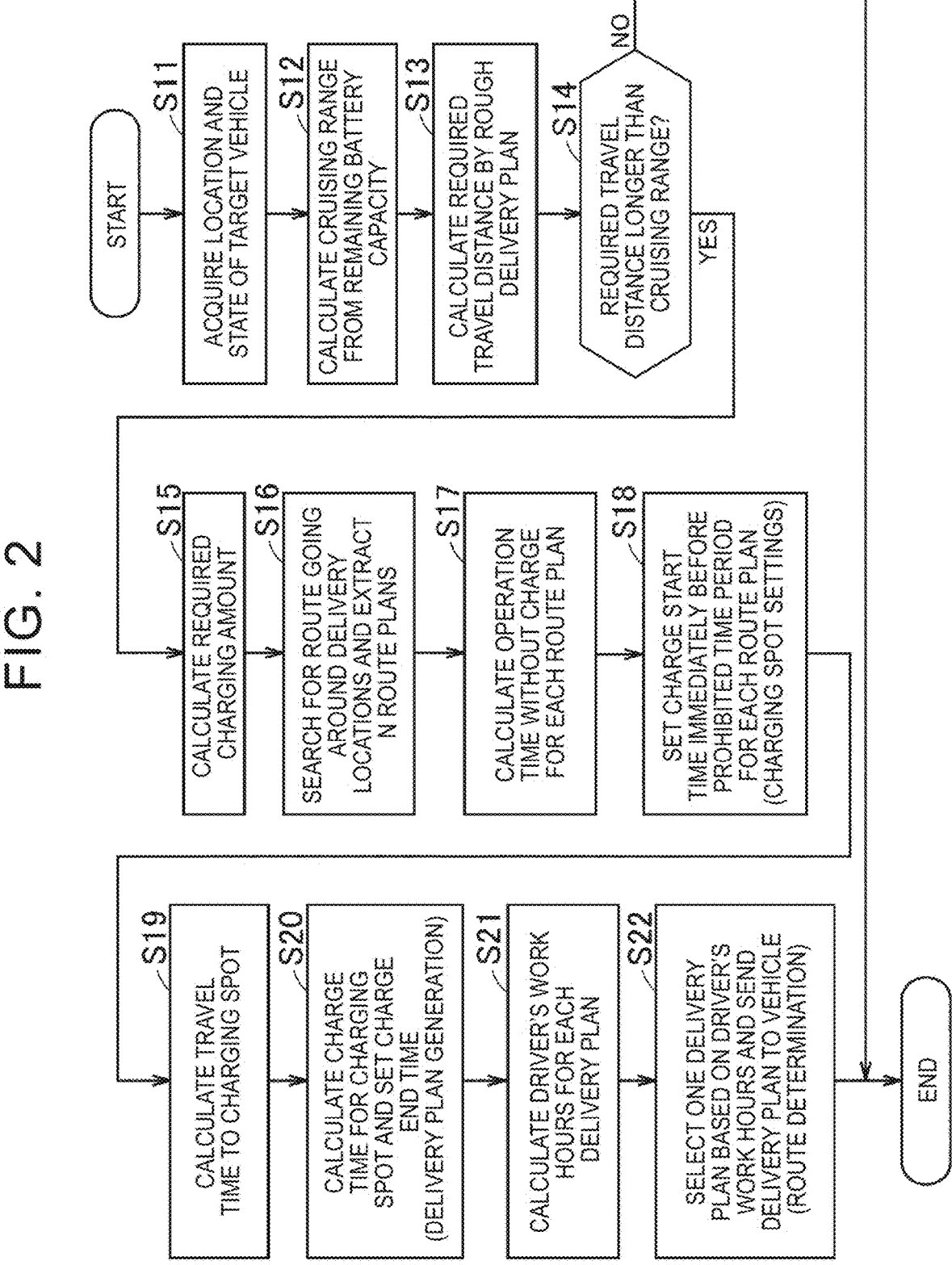

START

S11 ACQUIRE LOCATION AND STATE OF TARGET VEHICLE

S12 CALCULATE CRUISING RANGE FROM REMAINING BATTERY CAPACITY

S13 CALCULATE REQUIRED TRAVEL DISTANCE BY ROUGH DELIVERY PLAN

S14 REQUIRED TRAVEL DISTANCE LONGER THAN CRUISING RANGE? — NO / YES

S15 CALCULATE REQUIRED CHARGING AMOUNT

S16 SEARCH FOR ROUTE GOING AROUND DELIVERY LOCATIONS AND EXTRACT N ROUTE PLANS

S17 CALCULATE OPERATION TIME WITHOUT CHARGE FOR EACH ROUTE PLAN

S18 SET CHARGE START TIME IMMEDIATELY BEFORE PROHIBITED TIME PERIOD FOR EACH ROUTE PLAN (CHARGING SPOT SETTINGS)

S19 CALCULATE TRAVEL TIME TO CHARGING SPOT

S20 CALCULATE CHARGE TIME FOR CHARGING SPOT AND SET CHARGE END TIME (DELIVERY PLAN GENERATION)

S21 CALCULATE DRIVER'S WORK HOURS FOR EACH DELIVERY PLAN

S22 SELECT ONE DELIVERY PLAN BASED ON DRIVER'S WORK HOURS AND SEND DELIVERY PLAN TO VEHICLE (ROUTE DETERMINATION)

END

FIG. 4

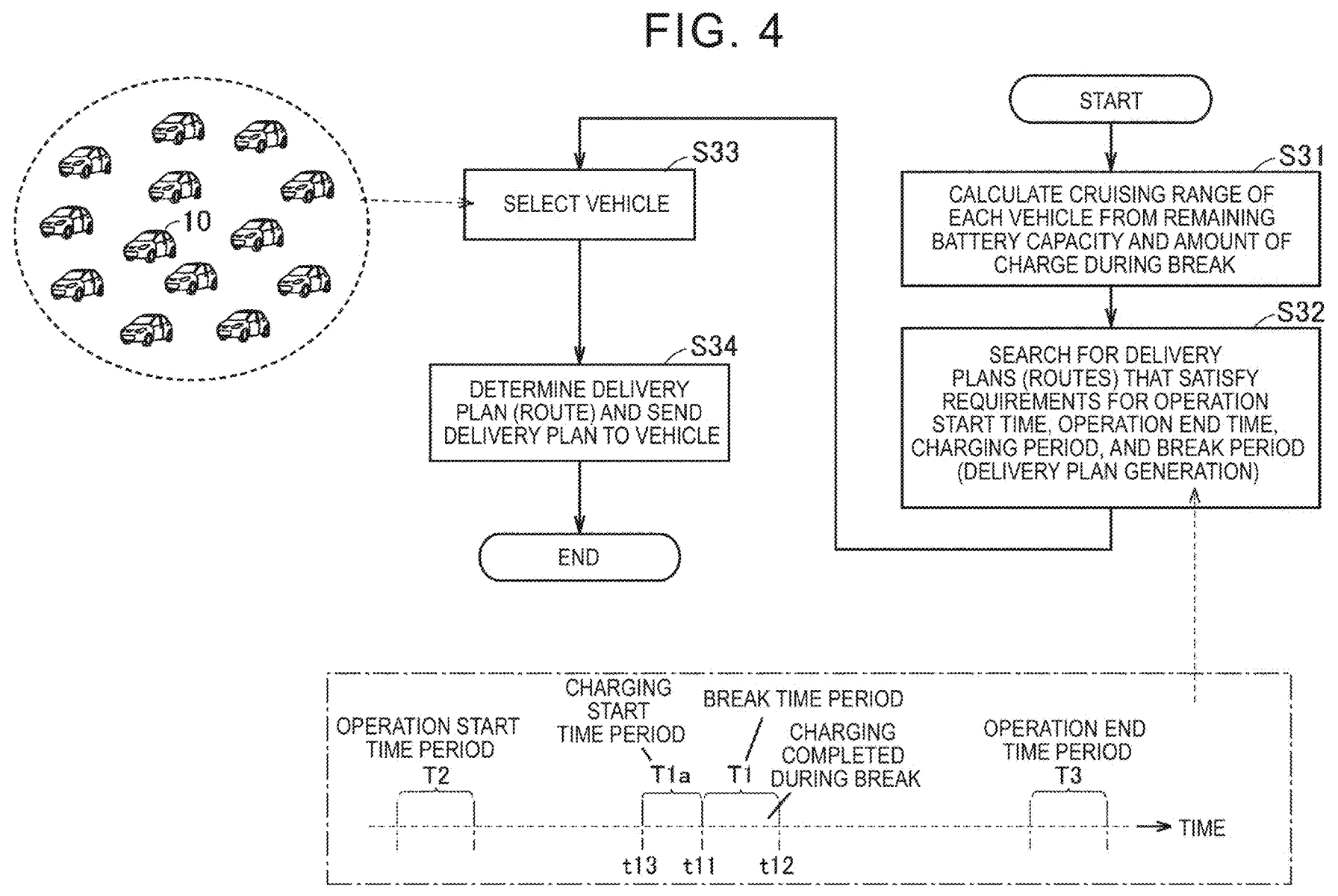

START

↓

S31 — CALCULATE CRUISING RANGE OF EACH VEHICLE FROM REMAINING BATTERY CAPACITY AND AMOUNT OF CHARGE DURING BREAK

↓

S32 — SEARCH FOR DELIVERY PLANS (ROUTES) THAT SATISFY REQUIREMENTS FOR OPERATION START TIME, OPERATION END TIME, CHARGING PERIOD, AND BREAK PERIOD (DELIVERY PLAN GENERATION)

↓

S33 — SELECT VEHICLE

↓

S34 — DETERMINE DELIVERY PLAN (ROUTE) AND SEND DELIVERY PLAN TO VEHICLE

↓

END

10

OPERATION START TIME PERIOD T2

CHARGING START TIME PERIOD T1a

BREAK TIME PERIOD T1 CHARGING COMPLETED DURING BREAK

OPERATION END TIME PERIOD T3 t13  t11  t12

TIME

INFORMATION PROCESSING DEVICE AND OPERATION SYSTEM

CROSS-REFERENCE TO RELATED APPLICATION

This application claims priority to Japanese Patent Application No. 2023-175324 filed on Oct. 10, 2023, incorporated herein by reference in its entirety.

BACKGROUND

1. Technical Field

The present disclosure relates to information processing devices and operation systems.

2. Description of Related Art

Japanese Unexamined Patent Application Publication No. 2004-131270 (JP 2004-131270 A) discloses a method for generating delivery plans for individual transportation companies by a center device.

SUMMARY

In the method described in JP 2004-131270 A, delivery plans are generated based on past operation performances so as to improve the loading rates of vehicles. However, pursuing only high loading rates of vehicles may prevent drivers from having enough break time. For example, in a system in which electrified vehicles such as battery electric vehicles perform deliveries, charging of the electrified vehicles may be required at some point in the delivery plan.

One possible way to make sure that the drivers of electrified vehicles have enough break time is to require the drivers to take a break during a predetermined time period (break time period). However, if the drivers determine a rest place and a charging period as they like, an idle time (time period during which substantially no work is done) tends to occur before the rest period. Such an idle time leads to a decrease in operation efficiency.

The present disclosure was made to address the above issue, and an object of the present disclosure is to prohibit operations of an electrified vehicle during a predetermined time period while reducing a decrease in operation efficiency of the electrified vehicle.

According to an aspect of the present disclosure, an information processing device is provided that generates an operation plan of an electrified vehicle. The electrified vehicle is configured to run on electric power stored in the electrified vehicle.

The information processing device is configured to search for a route including a plurality of target points and a target charging location, and generate the operation plan in such a manner that the electrified vehicle is operated according to the route in each of a first operation period and a second operation period, the first operation period being set to be before a prohibited time period, and the second operation period being set to be after the prohibited time period.

Operations of the electrified vehicle are prohibited during the prohibited time period.

The information processing device sets, for the operation plan, a charging period in such a manner that a start time of the charging period is before the prohibited time period and an end time of the charging period is during or after the prohibited time period, the charging period being a period in which the electrified vehicle is charged at the target charging location.

The present disclosure prohibits operations of electrified vehicles during a predetermined time period while reducing a decrease in operation efficiency of the electrified vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a method of generating an operation plan according to Embodiment 1;

FIG. 4 is a flowchart illustrating a method of generating an operation plan according to Embodiment 2;

DETAILED DESCRIPTION OF EMBODIMENTS

Figure 1:
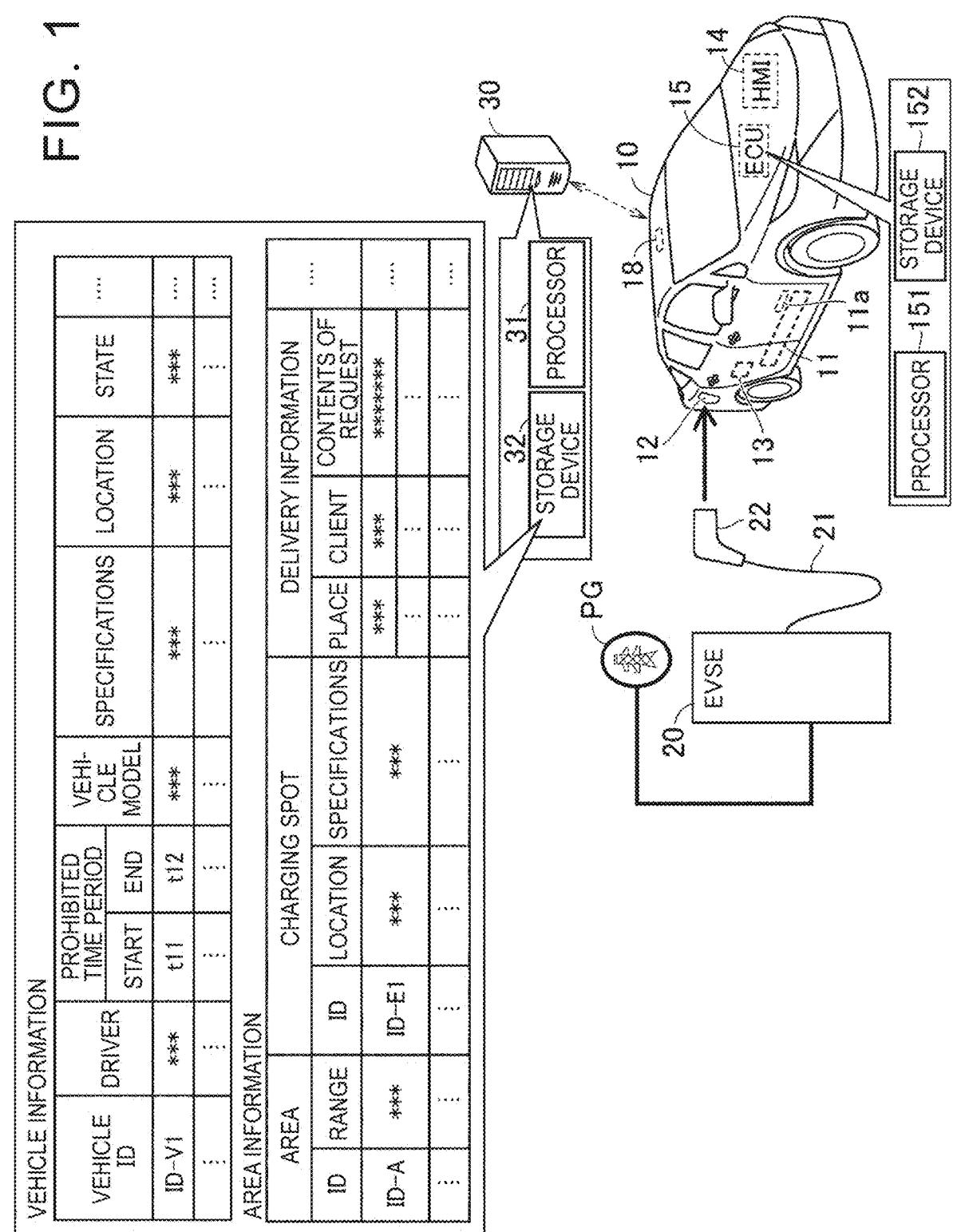
FIG. 1 is a diagram for describing a configuration of an operation system according to Embodiment 1.

An embodiment of the present disclosure will be described in detail with reference to the drawings. The same or corresponding parts in the drawings are designated by the same reference signs and repetitive description will be omitted.

Embodiment 1

FIG. 1 is a diagram for explaining a configuration of an operation system according to this embodiment. Referring to FIG. 1, the operation system includes a vehicle 10, an electric vehicle supply equipment (EVSE) 20, and a server 30. The server 30 corresponds to an example of an "information processing device" according to the present disclosure.

The vehicle 10 includes a power storage device 11, a battery management system (BMS) 11a, an inlet 12, a charger 13, a human machine interface (HMI) 14, an electronic control unit (ECU) 15, and a communication device 18. The vehicle 10 is, for example, a battery electric vehicle that can travel using the electric power of the power storage device 11.

The power storage device 11 includes a secondary battery (for example, a lithium-ion secondary battery). A plurality of secondary batteries may form a battery pack. The power storage device 11 may include an electric double layer capacitor instead of the secondary battery. BMS 11a detects the condition of the power storage device 11 (e.g., temperature, current, voltage, and SOC) and outputs the detected condition to ECU 15. State of charge (SOC) indicates a ratio of the present amount of stored electricity to the amount of stored electricity in a fully charged state.

The vehicle 10 is configured to perform external charging (charging by electric power from outside the vehicle). Specifically, the vehicle 10 is configured to be able to charge the power storage device 11 using electric power supplied from EVSE 20. EVSE 20 includes a main body portion electrically connected to the power system PG, and a charging cable 21 extending outward from the main body portion. The power system PG is a power grid constructed by a transmission and distribution facility. The inlet 12 of the vehicle 10 is configured such that the connector 22 (distal end portion) of the charging cable 21 is detachable. In a state in which the connector 22 of the charging cable 21 is connected to the inlet 12 of the vehicle 10 in the parked state (plug-in state), the vehicle 10 is supplied with electric power from EVSE 20. On the other hand, in a state in which the inlet 12 is not connected (plug-out state), the vehicle 10 is not supplied with electric power from EVSE 20. The vehicle 10 further includes a connection detection circuit (not shown) that detects a state (plug-in state/plug-out state) of the inlet 12.

In the external charge, the electric power supplied from the power system PG is inputted to the inlet 12 via EVSE 20. Then, the charger 13 uses the electric power supplied from the inlet 12 to generate the charging electric power according to the instruction from ECU 15, and inputs the generated charging electric power to the power storage device 11. The charger 13 is controlled by an ECU 15.

HMI 14 includes an input device that outputs information input from the user to ECU 15, and an output device (notification device) that outputs information to the user in accordance with an instruction from ECU 15. Examples of input devices include buttons or keypads, as well as smart speakers that accept voice input. Examples of the output device include a display device and a speaker.

ECU 15 includes a processor 151 and a storage device 152. The communication device 18 includes a communication interface (I/F) for radio communication. ECU 15 is configured to communicate with the server 30 through the communication device 18.

The server 30 includes a processor 31 and a storage device 32. The storage device 32 stores area information on a plurality of areas registered in the server 30 and vehicle information on a plurality of vehicles registered in the server 30. In this embodiment, electrified vehicle used for delivery is registered with the server 30. Each vehicle may have the same configuration as the vehicle 10 shown in FIG. 1. In addition, an electrified vehicle for delivery may be registered in the server 30.

The storage device 32 stores vehicle information for each vehicle separately by identifying information (vehicle ID) of the vehicle. The vehicle information includes, with respect to the corresponding vehicle, vehicle type information, specification information, position information, state information, information for identifying the driver, and information indicating a prohibited time period during which the vehicle is prohibited from operating. The specification information includes a capacity and a charging performance of a power storage device mounted on the vehicle, and a power cost of the vehicle. The state information is, for example, an electric storage amount. The information for identifying the driver is, for example, the name and contact of the driver. In this embodiment, the prohibited time period is a legal break time period common to all vehicles registered in the server 30. The statutory break time period is a time period in which the operation of the vehicle is prohibited in order to give the driver a break time determined by law. However, the present disclosure is not limited thereto, and a different prohibited time period may be set for each vehicle (for each driver).

The storage device 32 stores area information for each area by distinguishing the area identification information (area ID) from each other. The area information includes, with respect to a corresponding area, classification information indicating a range of the area, charging position information for specifying a position of a charging spot set for the area, and information indicating a specification of a EVSE installed in the charging spot. The information indicating the specification of EVSE is, for example, information indicating the power supply performance such as the rated power supply power. In the partition information, for example, the map information may be cooperated to indicate, on the map, a region (area range) corresponding to the corresponding area. The classification information may be registered in the application software having the geofencing function. In this embodiment, one charging spot is preset in each area registered in the server 30. The charging spot is located in a corresponding area (an area in which the charging spot is set). EVSE installed in the respective charging spots may have the same configuration as EVSE 20 shown in FIG. 1. EVSE may be either an AC power supply facility for outputting AC power or a DC power supply facility for outputting DC power.

Upon receiving a delivery request for a location (delivery location) belonging to the registered area, the server 30 adds delivery information related to the requested delivery to the storage device 32. The delivery information is distinguished for each delivery location and added to the area information of the area to which the delivery location belongs. That is, the added delivery data is associated with the area ID of the area to which the delivery location belongs. The delivery information includes, with respect to the corresponding delivery location, delivery location information for specifying the delivery location, information (for example, package identification information) regarding the package (delivery target) to be delivered to the delivery location, information regarding the delivery date, and information regarding the delivery requester (for example, the name and the contact address of the delivery requester).

FIG. 2 is a flowchart illustrating a delivery plan generation method according to Embodiment 1. The processing flow illustrated in FIG. 2 is started by the server 30 at a predetermined plan generation timing. The plan generation timing may be a time point which is a time point from the operation start time point to a predetermined time point (for example, one hour). For example, with respect to the operation started at 8:00 in the morning, the plan generation timing may be set at 7:00 in the morning. Each step in the flowchart is simply referred to as "S." Hereinafter, an example of generating a delivery plan for the vehicle 10 illustrated in FIG. 1 will be described.

Referring to FIG. 2, in S11, the server 30 wirelessly communicates with the vehicle 10 to acquire the position and status of the vehicle 10 (including SOC of the power storage device 11). In the following S12, the server 30 reads the vehicle information corresponding to the vehicle 10 from the storage device 32, and calculates the travelable distance of the vehicle 10 using SOC (remaining battery capacity) of the power storage device 11 acquired by S11 and the specification (e.g., electric power cost) of the vehicle 10. Electricity cost indicates the travelable distance per unit electric quantity.

In the following S13, the server 30 determines a plurality of delivery locations (hereinafter referred to as "target points") to be delivered by the vehicle 10 today based on the delivery information stored in the storage device 32 and the position of the vehicle 10 acquired by S11. The target point belongs to any of a plurality of areas registered in the server 30. Hereinafter, an area to which one or more target points belong is referred to as a "target area". In this embodiment, the server 30 determines a plurality of target points belonging to different target areas. Then, the server 30 generates a rough delivery plan for delivering the determined plurality of target points, and calculates a distance traveled when the vehicle 10 performs delivery according to the rough delivery plan (hereinafter, referred to as "travel required distance"). Subsequently, in S14, the server 30 determines whether or not the travel required distance (S13) is longer than the travel possible distance (S12).

When the required travel distance is not longer than the travelable distance (NO in S14), the process illustrated in FIG. 2 is terminated. In this case, the server 30 generates a delivery plan that does not include a charging period by a process flow (not shown), and transmits the delivery plan to the vehicle 10. On the other hand, when the travel required distance is longer than the travelable distance (YES in S14), the process proceeds to S15.

In S15, the server 30 uses the vehicle data stored in the storage device 32 to calculate the amount of electric power (required charge amount) to be charged to the power storage device 11 of the vehicle 10 during the delivery planning. Specifically, the server 30 calculates an amount of electric power (required amount of electric power) required for the vehicle 10 to travel a required travel distance based on the average electric power cost of the vehicle 10. Then, the server 30 calculates the amount of electric power held by the vehicle 10 (the amount of electric power held) based on the capacity and SOC of the power storage device 11, and acquires the required charge amount by subtracting the amount of electric power held from the amount of electric power required.

Subsequently, in S16, the server 30 determines the order of the operations in each of the plurality of target areas (S13), and searches for a route that can be delivered by the vehicle 10 to all target points. Specifically, the server 30 searches for a route on which delivery is performed for all target points by the vehicle 10 completing delivery for each target area while moving a plurality of target areas in accordance with the above-described order. In the operation according to such a route, the vehicle 10 completes the operation for all the target points included in one target area, and then moves to the next target area. A large number of route proposals are generated by the above search. Then, the server 30 extracts n route plans (n: an integer equal to or greater than 2) from the obtained multiple route plans. n can be set arbitrarily. The server 30 extracts, for example, n route plans in order of decreasing time (operation time) required to complete all deliveries. The operation time corresponds to a time from the operation start time to the operation end time. The operation start time may be a predetermined time (for example, 8 in the morning) common to all route proposals. The operation end time varies depending on the route.

In the following S17, the server 30 calculate the operation time (the operation time without charge) when the vehicle 10 is not charged with respect to the route plans extracted as described above. Assuming that the vehicle 10 is not depleted of electricity, the server 30 calculates the time required to complete all deliveries according to each route plan (operation time without charge).

In the following S18, the server 30 determines the charging starting time and the target charging location for the respective route proposals using the vehicle information and the area information stored in the storage device 32. Specifically, the server 30 determines, as the charging start time, a time which is a time from the start time of the prohibited time period of the vehicle 10 to a predetermined time (hereinafter, also referred to as a "charging time before the operation prohibition"). The charging time before the operation prohibition is prohibited can be arbitrarily set, but is, for example, 1 minute or more and less than 1 hour. Then, the server 30 refers to the area information and determines the charging spot set in the target area in which the vehicle 10 is located at the determined charging start time as the target charging location.

In the following S19, the server 30 modifies the respective route proposals so as to pass through the target charging location determined by S18, and calculates the operation time added by the modification (that is, the travel time to the target charging location) for each route proposal. In the following S20, the server 30 calculates the time (required charging time) required for charging the required charging amount to the vehicle 10 at the target charging location at the charging starting time for the corrected route proposals. Then, the server 30 determines the time at which the necessary charging time has elapsed from the charging start time as the charging end time. The charging end time is set in each route plan. In this embodiment, since the charging time before the operation prohibition is short, the charging end time is set within the prohibited time period or after the prohibited time period. As a result, a delivery plan for each route plan is obtained. The delivery plan indicates a route including a plurality of target points and a target charging location, an operation start time, an operation end time, a prohibited time period, and a charging period (charging start time and charging end time).

In the following S21, the server 30 calculates the work hours of the driver of the vehicle 10 in the delivery planning of the route proposals on the basis of the operation starting time, the operation ending time, and the prohibited time period. The work hours correspond to the time obtained by subtracting the prohibited time period (break time) from the time from the operation start time to the operation end time (working time). In the following S22, the server 30 selects the delivery plan having the shortest work hours of the driver from among the delivery plans generated for each of the n route plans as described above. When there is a plurality of delivery plans having the shortest work hours, the server 30 may select one delivery plan based on the amount of electric power (electric power consumption) consumed by the vehicle 10 for delivery. The server 30 may select a delivery plan with the lowest power consumption.

Then, the server 30 transmits the delivery plan determined as described above to the vehicle 10. When the vehicle 10 receives the delivery plan, ECU 15 causes HMI 14 (notification device) to notify the delivery plan. More specifically, HMI 14 is controlled by ECU 15 so that HMI 14 notifies the driver of the vehicle 10 of the delivery schedule. When the vehicle 10 executes the delivery according to the delivery plan, it is possible to inhibit the operation of the vehicle 10 in the prohibited time period while suppressing a decrease in the operation efficiency of the vehicle 10. Hereinafter, such effects will be further described with reference to FIG. 3.

Figure 3:
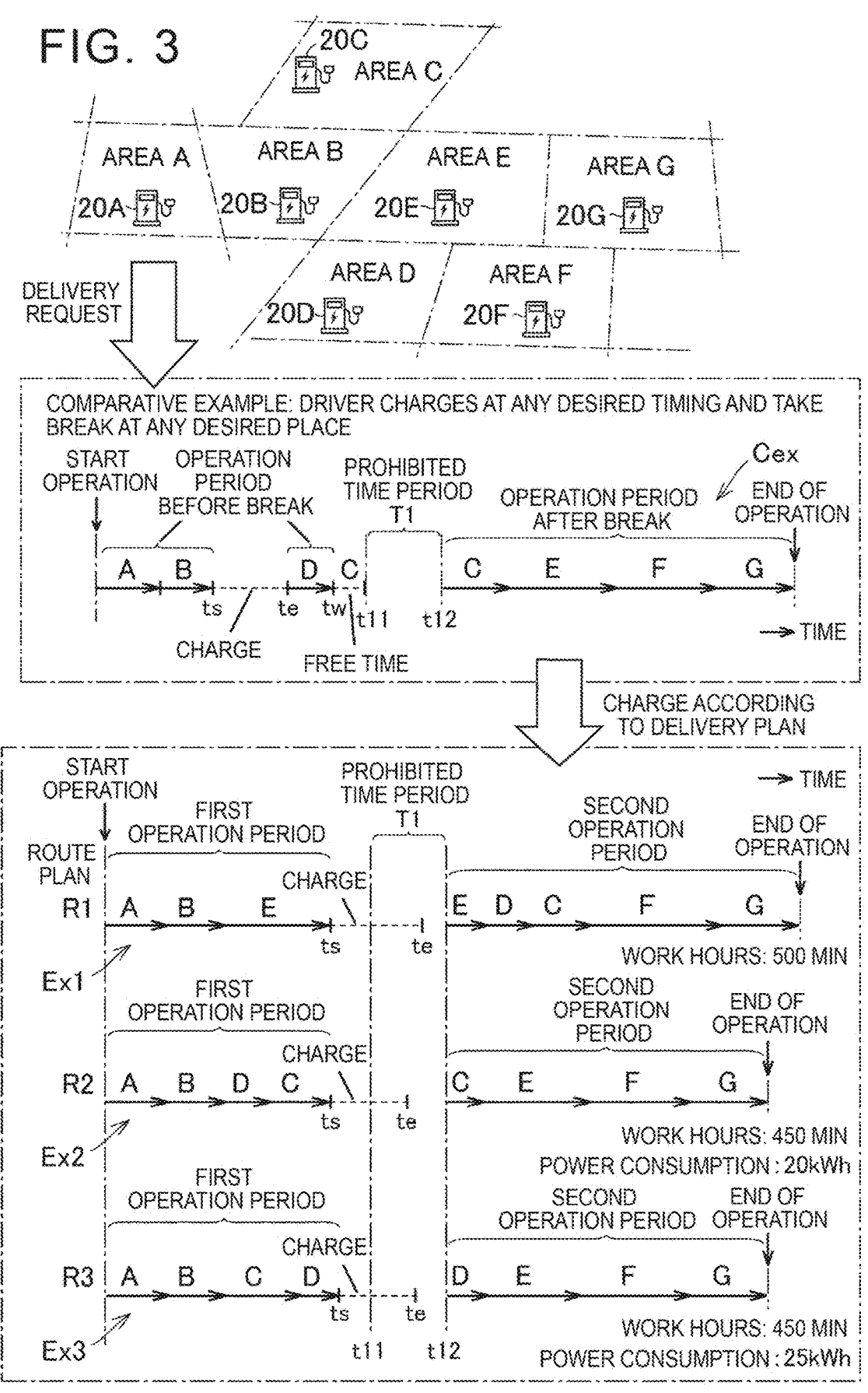
FIG. 3 is a diagram for describing an operation plan generated in Embodiment 1.

FIG. 3 is a diagram for explaining a delivery plan generated by the processing illustrated in FIG. 2. Each of the areas A, B, C, D, E, F, G illustrated in FIG. 3 corresponds to a target area. EVSE 20A, 20B, 20C, 20D, 20E, 20F, 20G is installed at the charging spots set in the areas A, B, C, D, E, F, and G, respectively. In FIG. 3, a time period T1 indicates a prohibited time period, a time t11 indicates a start time of the prohibited time period, and a time t12 indicates an end time of the prohibited time period. In addition, the time ts indicates a charging starting time, and the time te indicates a charging ending time. That is, the period from the time ts to the time te corresponds to the charging period.

The delivery example Cex shows a comparative example. In the comparative example, the driver of the vehicle 10 charges the vehicle 10 at an arbitrary timing regardless of the delivery plan, and takes a rest at an arbitrary place. In the delivery schedule according to the delivery example Cex, a free time (a period from the time tw to the time t11) is generated immediately before the time period T1. When the driver arbitrarily determines a rest place and a charging period, an idle time (a period in which substantially no work is performed) is likely to occur. The generation of the free time leads to a decrease in the operation efficiency.

Each of the route plans R1, R2, R3 is a route plan generated by the process illustrated in FIG. 2. In this instance, "n" in S16 is 3. The delivery plans Ex1, Ex2, Ex3 is a delivery plan corresponding to each of the route plans R1, R2, R3, and is generated by the process of S15 to S20 of FIG. 2. Then, the delivery plan Ex2 (route plan R2) is selected from the delivery plans Ex1 to Ex3 (route plans R1 to R3) by the subsequent S21 and S22 processes. Specifically, the work hours of the driver in the delivery planning Ex1, Ex2, Ex3 are 500 minutes, 450 minutes, and 450 minutes, respectively. For this reason, delivery planning Ex1 with long work hours are excluded. The power consumed in the delivery planning Ex2, Ex3 is 20 kWh, 25 kWh. For this reason, a delivery planning Ex2 that consumes less power is selected.

In the route plan R2, delivery is performed in the order of the areas A, B, D, C, E, F, and G. More specifically, the vehicle 10 moves to the area B after completing the delivery to all the target points included in the area A, completes the delivery to all the target points included in the area B, then moves to the area D, and so on. That is, the vehicle 10 operating according to the route plan R2 perform delivery to all target points included in the areas A to G according to the determined order of operation. In the delivery planning Ex2, the time ts arrives when the vehicle 10 is located in the area C. For this reason, the vehicle 10 charges the power storage device 11 using EVSE 20C installed in the charging spots (target charging locations in the area C) set in the area C. The time at which the delivery to all the target points included in the areas A to G is completed corresponds to the operation end time.

In any of the delivery planning Ex1 to Ex3, the time ts is set prior to the time period T1, and the time te is set within the time period T1. Therefore, the first operation period set prior to the time period T1 is a period from the operation starting time to the time ts. Further, the second operation period set after the time period T1 is a period from the time t12 to the operation ending time. That is, the operation of the vehicle 10 is temporarily interrupted at the time ts, and after the charging of the vehicle 10 is completed, the operation of the vehicle 10 is resumed at the time t12. It should be noted that, according to the process illustrated in FIG. 2, a delivery plan in which the time te is set after the time period T1 may be generated. In such a delivery plan, the timing of restarting the operation becomes the time te.

The server 30 (information processing device) according to the present embodiment executes searching for a route including a plurality of target points and a target charging location, and generating an operation plan such that electrified vehicle is operated according to the route in each of the first operation period and the second operation period (S15 to S20 in FIG. 2). The server 30 sets, for the operation plan, a charging period in which charging is performed on electrified vehicle at the target charging location such that the start time of the charging period is earlier than the prohibited time period and the end time of the charging period is later than the prohibited time period or the prohibited time period (S18, S20 in FIG. 2). According to the delivery plan thus generated, the start time (rest start time) of the prohibited time period comes in a state (plug-in state) in which the vehicle 10 is parked in the target charging location. Therefore, occurrence of an empty time immediately before the prohibited time period is suppressed. The driver of the vehicle 10 can take a break at the target charging location. Generally, the time required for charging electrified vehicle (particularly battery electric vehicle) is longer than the time required for refueling the internal combustion locomotive, so that it is possible to suppress a decrease in the operation efficiency of the vehicle 10 by the driver taking a required rest while charging the vehicle 10. By improving the operation efficiency, it becomes possible to increase the profit by the delivery.

Embodiment 2

Hereinafter, Embodiment 2 will be described with a focus on differences from Embodiment 1. In this embodiment, HMI 14 includes a touch panel display (hereinafter referred to as "TPD") and a car navigation system (hereinafter referred to as "NAVI"). NAVI corresponds to an exemplary "notification device" according to the present disclosure. ECU 15 corresponds to an exemplary "control device" according to the present disclosure.

In this embodiment, the server 30 executes the process flow illustrated in FIG. 4 instead of the process flow illustrated in FIG. 2, thereby selecting a vehicle to be delivered and determining a delivery plan for the vehicle. In this embodiment, the content of the delivery (a plurality of target points belonging to different target areas) is determined in advance, and the server 30 executes the process flow illustrated in FIG. 4 in order to select a vehicle to execute the delivery from among the plurality of registered vehicles (all of which are electrified vehicle).

FIG. 4 is a flowchart illustrating a delivery plan generation method according to Embodiment 2. Referring to FIG. 4, in S31, the server 30 acquires the position and status (including the remaining battery capacity) of each vehicle by radio communication with each registered vehicle. Then, the server 30 calculates the travelable distance of each vehicle based on the added value of the amount of electric power possessed by the vehicle and the amount of electric power charged to the vehicle when the vehicle is continuously charged in the prohibited time period. The calculated travelable distance is a travelable distance when the vehicle is continuously charged in the prohibited time period. Since the operation of the vehicle is prohibited in the prohibited time period, the vehicle can continue charging in the prohibited time period.

In a subsequent S32, the server 30 searches for delivery schedules that satisfy the first to eighth requirements described below for the registered vehicles. The first requirement is that the route includes all target points. The second requirement is that the delivery is performed in order for each target area. According to the delivery plan satisfying the second requirement, it becomes easy to grasp the delivery status, and it becomes easy to manage the delivery. The third requirement is that the prohibited time period is set to a predetermined time period T1 (legal break time period). The time period T1 is a period from the time t11 to the time t12. The fourth requirement is that the operation starting time is within a predetermined time period T2. The time period T2 is set prior to the time t11. The fifth requirement is that the operation ending time is within a predetermined time period T3. The time period T3 is set after the time t12. According to the delivery plan satisfying the third to fifth requirements, it is easy to appropriately manage the work hours of the driver. The sixth requirement is that the charge starting time is within a predetermined time period T1a. The time period T1a is a period from the time t13 to the time t11. The time t13 is set between the end time of the time period T2 and the time t11. The seventh requirement is to set the charging spot set in the target area in which the vehicle is located at the charging start time as the target charging location. The eighth requirement is that the charging end time is within the prohibited time period. According to the eighth requirement delivery scheme, the second operation period is initiated at time t12 at all times. Since the start timing of the second operation period is determined, the server 30 can easily manage the operation. The length of each time period can be set arbitrarily. Each of the time periods T2, T3 may be one point (predetermined time). The time periods T1, T1a, T2, T3 are stored in the storage device 32.

The search generates a delivery plan satisfying the first to eighth requirements. In the following S33, the server 30 selects, from among the plurality of registered vehicles, vehicles capable of delivering to all target points according to the delivery schedules satisfying the first to eighth requirements. When a plurality of vehicles is applicable, one vehicle may be selected based on the position and specifications of the vehicle. In a subsequent S34, the server 30 determines a delivery plan for the selected vehicles (a delivery plan that meets the first through eighth requirements above). If there is a plurality of delivery plans that satisfy the first to eighth requirements for the selected vehicle, the server 30 may select the delivery plan with the lowest power consumption. The server 30 then transmits the delivery plan to the selected vehicle. Hereinafter, an example in which the vehicle 10 illustrated in FIG. 1 is selected will be described.

Figure 5:
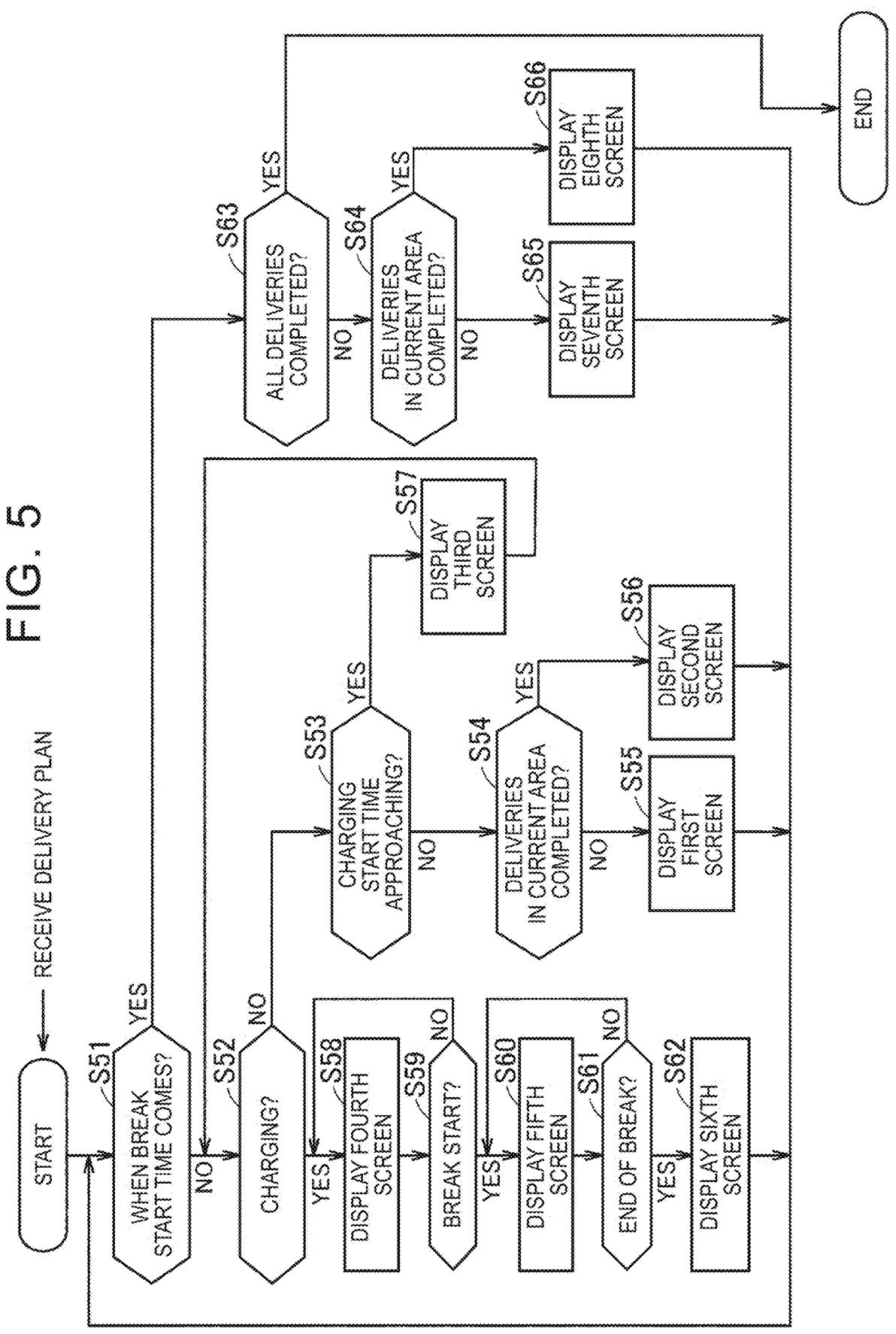
FIG. 5 is a flow chart showing display control according to Embodiment 2.
Figure 6:
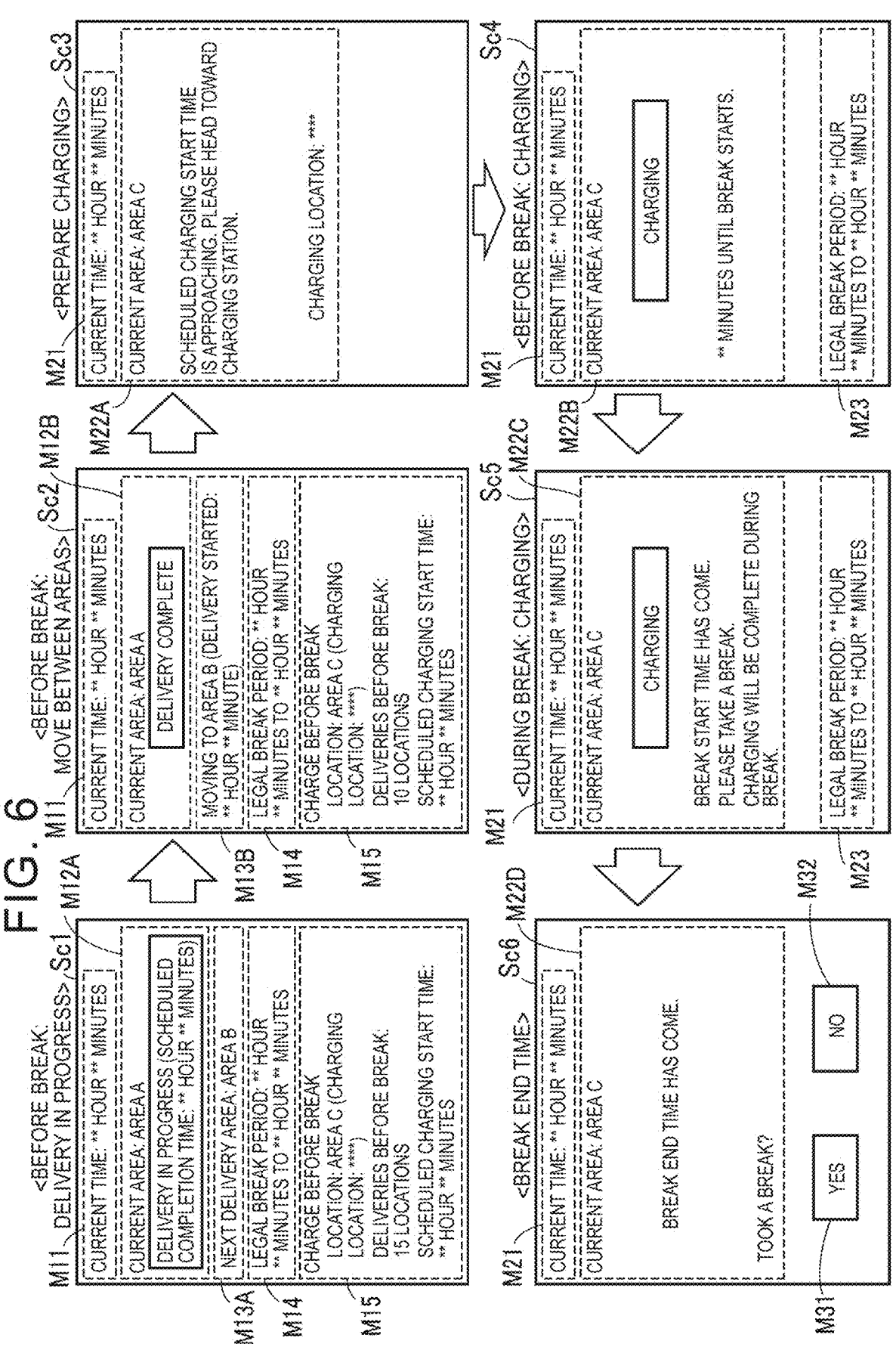
FIG. 6 is a diagram illustrating a screen displayed in the display control according to the second embodiment.

When the vehicle 10 receives the delivery plan from the server 30, the route indicated by the delivery plan is set to NAVI of HMI 14, and NAVI guides the driver according to the route. In addition, ECU 15 starts the process illustrated in FIG. 5. FIG. 5 is a flowchart illustrating display control by the vehicle 10. FIG. 6 is a diagram illustrating first to sixth screens displayed in the display control.

Referring to FIG. 5, in S51, ECU 15 determines whether or not the start time (rest start time) of the prohibited time period indicated by the delivery plan has arrived. If the present time is earlier than the rest starting time (time t11) (NO in S51), the process proceeds to S52. In S52, ECU 15 determines whether or not the vehicle 10 is being charged. Specifically, ECU 15 determines whether or not the external charge described above is being performed. If the vehicle 10 is not charging (NO in S52), the process proceeds to S53. In S53, ECU 15 determines whether or not a predetermined time has elapsed from the charging starting time indicated by the delivery plan (hereinafter, referred to as a "charging preparation time"). The charging preparation time is set slightly before (for example, 10 minutes before) the charging start time.

Immediately after the operation starts, it is determined that NO occurs in all of S51 to S53, and the process proceeds to S54. ECU 15 performs, at S54 to S56, indication control during the first operation period. Specifically, in S54, ECU 15 determines whether or not the delivery to the present area (the target area in which the vehicle 10 is located) has been completed. ECU 15 can recognize the delivery status of the vehicle 10 on the basis of, for example, the position of the vehicle 10 on the route indicated by the delivery plan or an entry (status report) from the driver to HMI 14.

If the delivery to any of the target points included in the present area has not been completed (NO in S54), the process proceeds to S55. In S55, ECU 15 displays the screen Sc1 (first screen) shown in FIG. 6 on TPD of HMI 14. More specifically, ECU 15 controls TPD so that TPD displays screen Sc1. The display Sc1 includes display units M11, M12A, M13A, M14 and M15. The display unit M11 displays the present time. The display unit M12A displays a current area, a delivery status (during delivery), and a delivery plan (a scheduled time at which delivery to the current area is completed). The display unit M13A displays the next area indicated by the delivery plan (the target area to be delivered next to the present area). The display unit M14 displays a prohibited time period (legal break time period). The display unit M15 displays the target charging location and the charging start time indicated by the delivery plan, and the numbers of target points to be delivered prior to the charging start.

When the delivery to all the target points included in the present area is completed (YES in S54), the process proceeds to S56. In S56, ECU 15 displays the screen Sc2 (second screen) shown in FIG. 6 on TPD of HMI 14. The display Sc2 includes display units M11, M12B, M13B, M14 and M15. The display unit M12B displays the present area and the delivery status (delivery completion). The display unit M13B displays the status of the vehicle 10 (moving to the next area) and the delivery plan (scheduled time at which delivery is started in the next area). The display units M11, M14, M15 of the screen Sc2 is the same as the screen Sc1.

When S55 or S56 process is executed, the process returns to S51. While the charge-ready time does not arrive, S54 to S56 is executed during the first operation period. When the charge-ready time arrives (YES in S53), the process proceeds to S57. In S57, ECU 15 displays the screen Sc3 (third screen) shown in FIG. 6 on TPD of HMI 14. The display Sc3 includes display units M21 and M22A. The display unit M21 displays the present time. The display unit M22A displays the present area and a message prompting the driver to go to the target charging location. When the driver touches the display unit M22A, TPD or NAVI may display the target charging location on the map.

When S57 process is executed, the process returns to S52. Then, when the vehicle 10 arrives at the target charging location and the external charging of the power storage device 11 is executed by the driver, it is determined that S52 is YES, and the process proceeds to S58. In S58, ECU 15 displays the screen Sc4 (fourth screen) shown in FIG. 6 on TPD of HMI 14. The display Sc4 includes display units M21, M22B and M23. The display unit M21 displays the present time. The display unit M22B displays the present area, the status of the vehicle 10 (being charged), and the remaining time up to the rest starting time (time t11). The display unit M23 displays a prohibited time period (legal break time period).

Subsequently, ECU 15 determines whether or not a rest starting time (time t11) has arrived in S59. While the break starting time does not arrive (NO in S59), S58, S59 is repeated. Therefore, HMI 14 continues to display the screen Sc4 until the rest start time is reached, and the display unit M22B counts down the remaining time until the rest start time. Then, when the rest starting time arrives (YES in S59), the process proceeds to S60. In S60, ECU 15 displays the screen Sc5 (fifth screen) shown in FIG. 6 on TPD of HMI 14. The display Sc5 includes display units M21, M22C and M23. The display unit M22C displays the present area, the status of the vehicle 10 (charging), a message prompting the driver to take a rest, and a message notifying the driver that the charging is completed during the rest. The display unit M21, M23 of the screen Sc5 is the same as the screen Sc4.

Subsequently, ECU 15 determines whether or not the end time (rest end time) of the prohibited time period indicated by the delivery plan has arrived in S61. While the rest ending time (time t12) does not arrive (NO in S61), S60, S61 is repeated. When the rest ending time arrives (YES in S61), the process proceeds to S62. In S62, ECU 15 displays the screen Sc6 (sixth screen) shown in FIG. 6 on TPD of HMI 14. The display Sc6 includes display units M21, M22D and operation units M31, M32 (for example, buttons). The display unit M22D displays a message for notifying the driver that the rest ending time has arrived, and an explanation regarding the operation units M31, M32. When the driver operates the operation unit M31, a first notification signal indicating that the driver has taken a rest according to the legal rest period is transmitted from the vehicle 10 to the server 30. When the driver operates the operation unit M32, a second notification signal indicating that the driver has not taken a rest according to the legal rest period is transmitted from the vehicle 10 to the server 30.

When S62 process is executed, the process returns to S51. Then, S51 determines YES, and the process proceeds to S63. In S63, ECU 15 determines whether or not delivery to all target areas has been completed. If the delivery to any of the target areas is not completed (NO in S63), ECU 15 executes the display control in the second operation period in S64 to S66. In S64, S65, S66, processes corresponding to S54, S55, S56 are executed. However, in S65, the seventh screen is displayed instead of the screen Sc1. The seventh screen is a screen in which the display units M14, M15 are removed from the screen Sc1. In S66, the eighth screen is displayed instead of the screen Sc2. The eighth screen is a screen in which the display units M14, M15 are removed from the screen Sc2. After that, when delivery to all target areas is completed (YES in S63), the process illustrated in FIG. 5 ends. According to the above-described display control, the driver can easily operate the vehicle 10 as planned.

When the second notification signal is received from the vehicle 10, the server 30 may change the delivery plan of the vehicle 10 to allow the driver of the vehicle 10 to take a break, and transmit the changed delivery plan to the vehicle 10. Further, the server 30 may grasp the delivery state of the vehicle 10 based on information (for example, position information) sequentially received from the vehicle 10. When the server 30 detects that the operation of the vehicle 10 does not proceed according to the plan (delivery plan), it may change the delivery plan of the vehicle 10 and transmit the changed delivery plan to the vehicle 10. The server 30 may request another vehicle to perform delivery excluded from the delivery plan of the vehicle 10 by changing the delivery plan.

Other Embodiments

The processes illustrated in FIGS. 2, 4, and 5 are executed by one or more processors executing programs stored in one or more memories. However, the present disclosure is not limited thereto, and these processes may be executed only by hardware (electronic circuit) without using software. In the first embodiment, the display control illustrated in FIG. 5 may be executed.

The operation of electrified vehicle is not limited to the operation for delivery, and may be an operation for mobile sales (for example, mobile supermarket) or an operation for transportation of persons. Electrified vehicle may be an electrified vehicle (e.g., plug-in hybrid electric vehicle)

other than BEV. Electrified vehicle may operate by autonomous driving. Operation may be prohibited in the prohibited time period to pause the vehicle rather than the driver. The external charging is not limited to plug-in charging, and may be non-contact charging.

The embodiment disclosed herein should be considered as illustrative and not restrictive in all respects. The scope of the present disclosure is shown by the claims rather than the above embodiment, and is intended to include all modifications within the meaning and the scope equivalent to those of the claims.

What is claimed is:

1. An operation system, comprising:
   a server; and
   an electrified vehicle including
      an inlet configured to be connected to a connector of a charge cable of electric vehicle supply equipment (EVSE),
      an electronic control unit implemented by a processor, and
      a human-machine interface (HMI), the HMI including a touch panel display and a car navigation system, wherein:
   the server is configured to
      search for a route including a plurality of target points and a target charging location,
      generate an operation plan for the electrified vehicle in such a manner that the electrified vehicle is operated according to the route in each of a first operation period and a second operation period, the first operation period being set to be before a prohibited time period during which operations of the electrified vehicle are prohibited, and the second operation period being set to be after the prohibited time period,
      set, for the operation plan, a charging period in such a manner that a start time of the charging period is before the prohibited time period and an end time of the charging period is during the prohibited time period, the charging period being a period in which the electrified vehicle is charged at the target charging location, and
      send the generated operation plan to the electrified vehicle; and
   the processor is configured to
      detect connection of the inlet of the electrified vehicle to the connector of the charge cable of the EVSE installed at the target charging location, in a case where a determination is made that a start time of the prohibited time period has not arrived,
      cause the touch panel display to display a first screen in response to the connection of the inlet of the electrified vehicle to the connector of the charge cable of the EVSE, the first screen including a current time, the start time and an end time of the prohibited time period, and a countdown of a remaining time until the start time of the prohibited time period,
      determine whether the start time of the prohibited time period indicated in the operation plan received from the server has arrived,
      cause the touch panel display to display a second screen in a case where a determination is made that the start time of the prohibited time period has arrived, the second screen including a message prompting a driver of the electrified vehicle to take a rest,
      determine whether the end time of the prohibited time period indicated in the operation plan has arrived, cause the touch panel display to display a third screen in a case where a determination is made that the end time of the prohibited time period has arrived, the third screen including a first icon indicating completion of the rest and a second icon indicating incompletion of the rest, detect an input by the driver to the first icon and the second icon, transmit a first notification indicating that the driver has taken the rest to the server in response to detecting the input to the first icon, and transmit a second notification indicating that the driver has not taken the rest to the server in response to detecting the input to the second icon.

2. The operation system according to claim 1, wherein the server is further configured to change the operation plan in response to receiving the second notification, and transmit the changed operation plan to the electrified vehicle.

3. The operation system according to claim 1, wherein the first screen and the second screen each further include a charging status of the electrified vehicle, the second screen further includes a message notifying the driver that charging is completed during the rest, and the third screen further includes a message notifying the driver that the end time of the prohibited time period has arrived.

4. The operation system according to claim 1, wherein the processor is further configured to determine whether a charging preparation time has arrived in a case where the connection is not detected, the charging preparation time being a predetermined time before the start time of the charging period indicated in the operation plan, and cause the touch panel display to display a fourth screen in a case where a determination is made that the charging preparation time has arrived, the fourth screen including a message prompting the driver to head to the target charging location.

5. The operation system according to claim 4, wherein the processor is further configured to detect an input by the driver to the fourth screen, and cause the car navigation system to display the target charging location on a map in response to detecting the input by the driver to the fourth screen.

6. The operation system according to claim 1, wherein the electrified vehicle is configured to be operated by autonomous driving according to the operation plan.

* * * * *